US012625823B2

(12) United States Patent
 Huang

(10) Patent No.: US 12,625,823 B2
(45) Date of Patent: May 12, 2026

(54) METHOD OF GENERATING FIRMWARE COMPATIBLE PERIPHERAL DEVICE DRIVERS, TERMINAL DEVICE AND STORAGE MEDIUM

(71) Applicant: PAX COMPUTER TECHNOLOGY (SHENZHEN) CO., LTD., Shenzhen (CN)

(72) Inventor: Bicong Huang, Shenzhen (CN)

(73) Assignee: PAX COMPUTER TECHNOLOGY (SHENZHEN) CO., LTD., Shenzhen (CN)

( * ) Notice: Subject to any disclaimer, the term of this patent is extended or adjusted under 35 U.S.C. 154(b) by 99 days.

(21) Appl. No.: 18/722,672

(22) PCT Filed: Aug. 30, 2022

(86) PCT No.: PCT/CN2022/115884
 § 371 (c)(1),
 (2) Date: Jun. 21, 2024

(87) PCT Pub. No.: WO2023/124170
 PCT Pub. Date: Jul. 6, 2023

(65) Prior Publication Data
 US 2025/0061064 A1 Feb. 20, 2025

(30) Foreign Application Priority Data
 Dec. 30, 2021 (CN) .......................... 202111662392.4

(51) Int. Cl.
 *G06F 13/10* (2006.01)
 *G06F 9/4401* (2018.01)

(52) U.S. Cl.
 CPC ............ *G06F 13/10* (2013.01); *G06F 9/4411* (2013.01)

(58) Field of Classification Search
 CPC ............................... G06F 13/10; G06F 9/4411
 See application file for complete search history.

(56) References Cited

U.S. PATENT DOCUMENTS

| | | | | |
|---|---|---|---|---|
| 7,765,280 B2 * | 7/2010 | Akins, III | ........ | H04N 21/41265 709/219 |
| 8,219,653 B1 * | 7/2012 | Keagy | ........................ | G06F 8/63 718/1 |
| 2002/0112052 A1 * | 8/2002 | Brittingham | ........ | G06F 9/44505 709/224 |

(Continued)

*Primary Examiner* — Mohamed A. Wasel
(74) *Attorney, Agent, or Firm* — ScienBiziP, P.C.

(57) ABSTRACT

The present application is applicable to a field of computer technology, and provides a data processing method, a terminal device and a storage medium. The method is applied in a first terminal, which has loaded a first firmware, the first firmware including a first instruction set and first configuration information corresponding to each peripheral device. The method including: the first terminal acquires second configuration information from the first firmware according to the first instruction set, the second configuration information being first configuration information corresponding to target peripheral devices of the first terminal; and the first terminal drives the target peripheral devices according to the first instruction set and the second configuration information. The method can save software research and development resources.

15 Claims, 4 Drawing Sheets

S101

The first terminal acquires second configuration information from the first firmware according to the first instruction set, the second configuration information being first configuration information corresponding to target peripheral devices of the first terminal

S102

The first terminal drives the target peripheral devices according to the first instruction set and the second configuration information

(56)  References Cited

U.S. PATENT DOCUMENTS

2008/0127165 A1\*  5/2008  Mullis ....................... G06F 8/65
                                                              717/173
2014/0089531 A1\*  3/2014  Bhogal ................. G06F 9/4411
                                                              710/8

\* cited by examiner

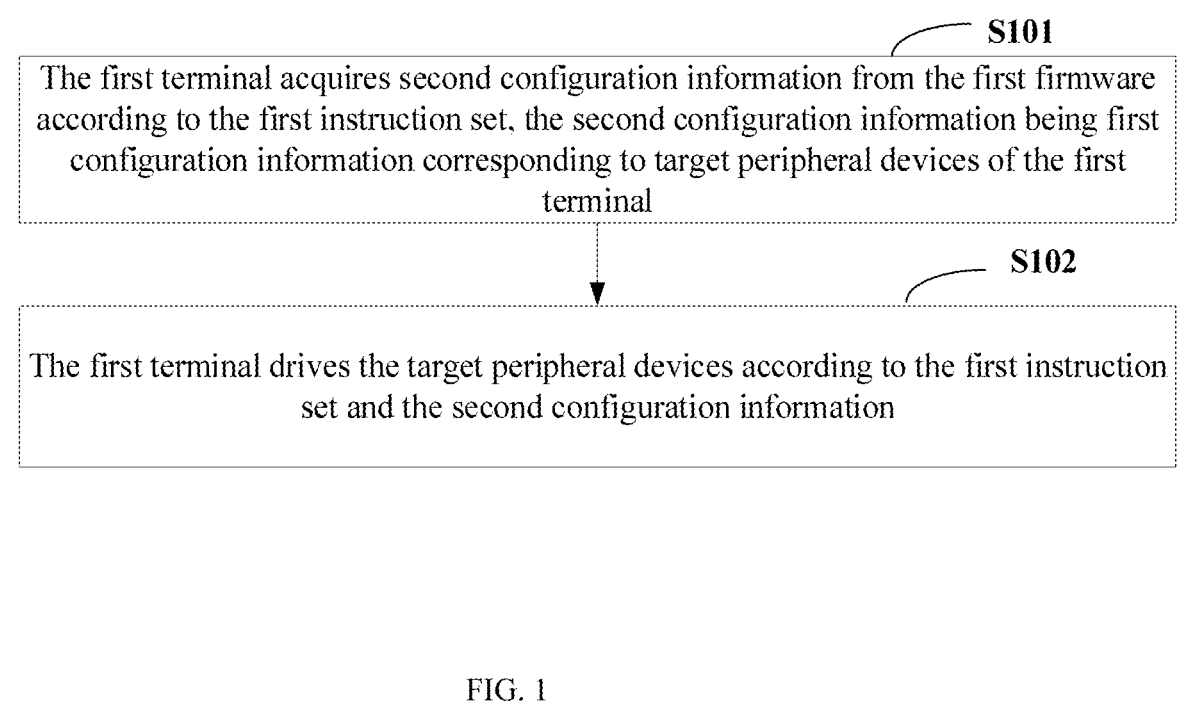

S101

The first terminal acquires second configuration information from the first firmware according to the first instruction set, the second configuration information being first configuration information corresponding to target peripheral devices of the first terminal

S102

The first terminal drives the target peripheral devices according to the first instruction set and the second configuration information

FIG. 1

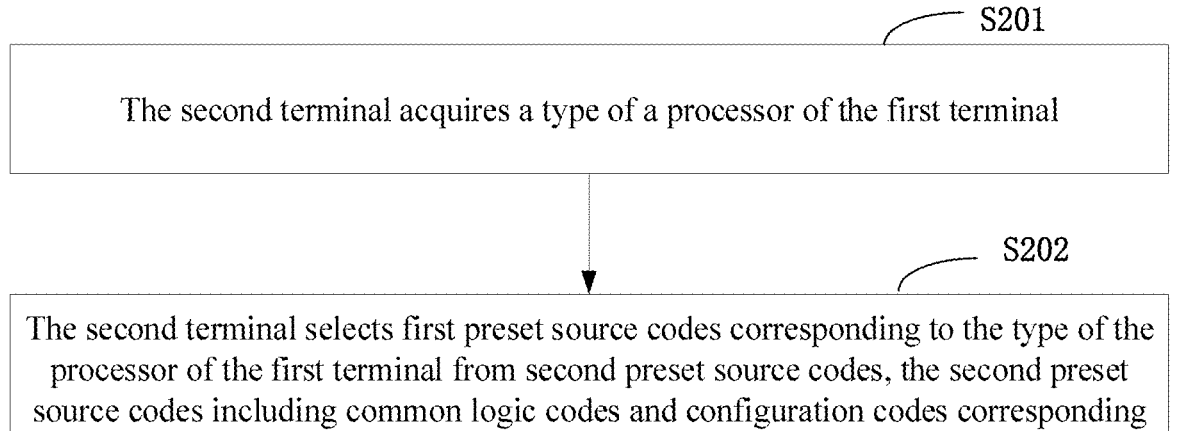

S201

The second terminal acquires a type of a processor of the first terminal

S202

The second terminal selects first preset source codes corresponding to the type of the processor of the first terminal from second preset source codes, the second preset source codes including common logic codes and configuration codes corresponding to each of the plurality of peripheral devices, and different second preset source codes corresponding to different types of processors

S203

The second terminal generates the first firmware according to the first preset source codes and loads the first firmware into the first terminal

FIG. 2

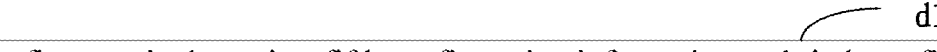

d1

The first terminal acquires fifth configuration information and sixth configuration information from the first firmware according to the first instruction set, wherein the fifth configuration information is first configuration information corresponding to a peripheral device of a third terminal, and the sixth configuration information is first configuration information corresponding to the target peripheral devices, the sixth configuration information is different from the first configuration information of the peripheral device of the third terminal d2

The first terminal extracts common seventh configuration information of the first terminal and the third terminal from the fifth configuration information d3

The first terminal obtains the second configuration information according to the sixth configuration information and the seventh configuration information

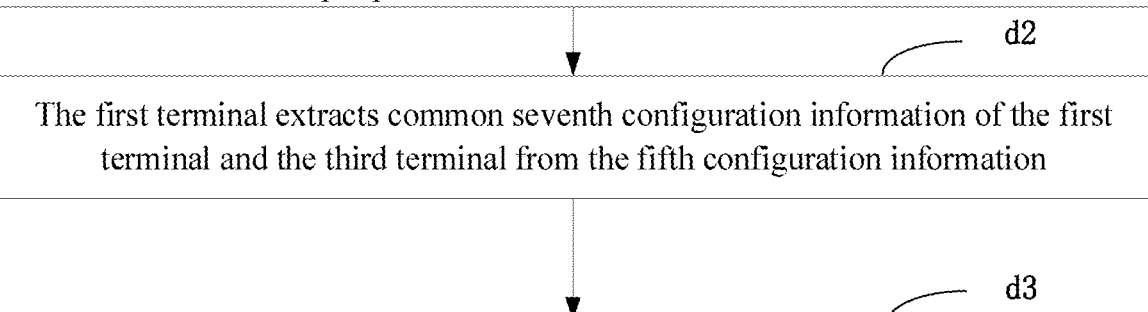

METHOD OF GENERATING FIRMWARE COMPATIBLE PERIPHERAL DEVICE DRIVERS, TERMINAL DEVICE AND STORAGE MEDIUM

This application claims a priority of a Chinese Patent Application with an application number 202111662392.4 filed with the China National Intellectual Property Administration on Dec. 30, 2021, the entire contents of which are incorporated by reference in the present application.

FIELD

The present application belongs to a field of computer technology, and in particular relates to a data processing method, a system, a terminal device and a storage medium.

BACKGROUND

With rapid development of an electronic technology and a network technology, a transaction volume of non-cash business is in a stage of rapid development. As an important manner of electronic payment, point of sale (POS) transactions have also been more and more widely used. At present, a POS industry has developed different types of POS terminals, and different types of POS terminals correspond to different functional configurations, for satisfying different needs of a payment market.

In order to deal with differences in security processor models, peripheral modules, peripheral communication interface resources, peripheral general input and output resources, and functional configurations of different types of POS terminals, development and maintenance of operating systems on the security processors of different types of POS terminals employed different software code bases and firmware. Each firmware could only be applied to one type of terminal, and a compatibility is poor, resulting in a significant waste of software development resources.

BRIEF DESCRIPTION OF THE DRAWINGS

In order to more clearly illustrate technical solutions in the embodiments of the present application, drawings that need to be used in the descriptions of the embodiments or the prior art will be briefly introduced below. Obviously, the drawings in the following description are merely some examples of the present application, those of ordinary skill in the art can also obtain other drawings based on the drawings without paying creative efforts.

FIG. 1 is a schematic flowchart of a data processing method provided by an embodiment of the present application;

FIG. 2 is a schematic flowchart of a data processing method provided by another embodiment of the present application;

FIG. 3 is a schematic flowchart of implementation steps of S101 in FIG. 1;

DESCRIPTION

Figure 4:
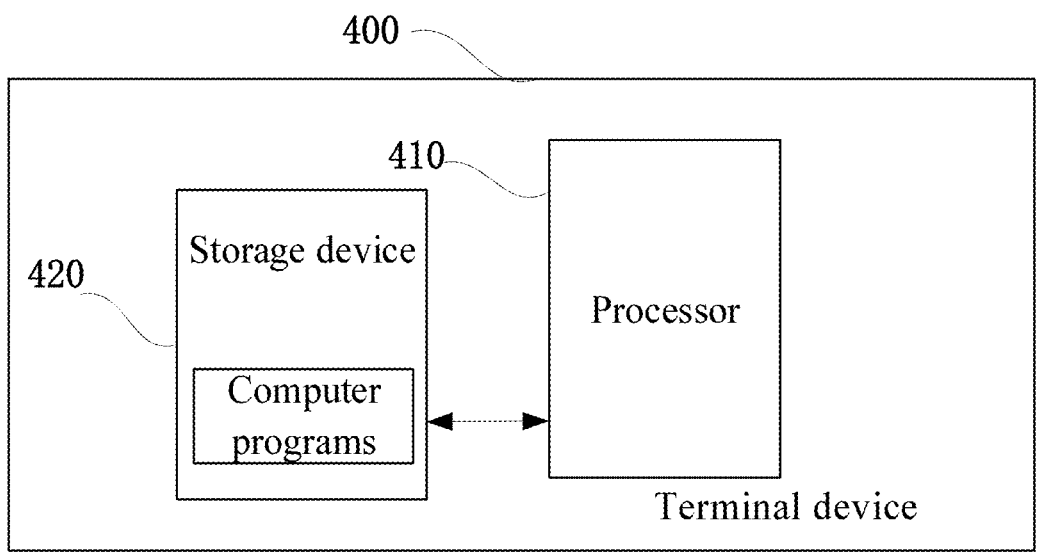
FIG. 4 is a schematic structural diagram of a terminal device provided by an embodiment of the present application.

In following description, specific details such as specific system structures and technologies are presented for a purpose of illustration rather than limitation, so as to thoroughly understand the embodiments of the present application. However, it should be clear to those skilled in the art that the present application can be implemented in other embodiments without these specific details. In other cases, detailed descriptions of well-known systems, devices, circuits, and methods are omitted to avoid unnecessary details that may hinder description of the present application.

It should be understood that when used in this specification and appended claims, a term "including" indicates a presence of described features, integers, steps, operations, elements and/or components, but does not exclude the presence or addition of one or more other features, integers, steps, operations, elements, components and/or groups thereof.

As used in this specification and the appended claims, a term "if" may be construed depending on a context as "when" or "once" or "in response to determine" or "in response to detect". Similarly, a phrase "if determined" or "if a described condition or an event is detected" may be construed, depending on the context, to mean "once determined" or "in response to determine" or "once detected the described condition or the event" or "in response to detection of the described condition or the event".

In addition, in the description of the specification and the appended claims of the present application, terms "first", "second", "third" and so on are only used to distinguish descriptions, and should not be understood as indicating or implying relative importance.

Reference to "one embodiment" or "some embodiments" or the like in the specification of the present application means that particular features, structures, or characteristics described in connection with the embodiment are included in one or more embodiments of the present application. Therefore, appearances of the phrases "in one embodiment", "in some embodiments", "in other embodiments", "in other embodiments again" and the like in various places in this specification are not necessarily all referring to same embodiment, but mean "one or more but not all embodiments" unless expressly specified otherwise. Terms "including", "comprising", "having" and their variations mean "including but not limited to", unless expressly specified otherwise.

FIG. 1 shows a schematic flowchart of a data processing method provided by the present application. The method is applied in a first terminal, which has loaded a first firmware. The first firmware includes a first instruction set and first configuration information corresponding to each peripheral device. Referring to FIG. 1, detailed description of the data processing method is provided as follows:

In S101, the first terminal acquires second configuration information from the first firmware according to the first instruction set. The second configuration information is first configuration information corresponding to target peripheral devices of the first terminal.

The first instruction set is generated by common logic codes, and the first configuration information corresponding to each peripheral device is generated by each peripheral device corresponding to first configuration codes.

The common logic codes refer to software codes corresponding to same and stable software requirements among different terminals. The corresponding first configuration codes of each of the plurality of peripheral devices refer to software codes corresponding to different and changing software requirements among different terminals. The common logic codes and the corresponding first configuration codes of each of the plurality of peripheral devices form a set of software codes, which are compiled to generate the first firmware.

The first firmware is generated by first preset source codes, and the first preset source codes include common logic codes and the corresponding first configuration codes of each of the plurality of peripheral devices.

Specifically, after a processor of the first terminal is powered on, the processor of the first terminal is started based on startup instructions in the first instruction set, and then the processor of the first terminal obtains the second configuration information from the first firmware, according to search instructions in the first instruction set. Specific implementation process refers to a first embodiment for details.

In S102, the first terminal drives the target peripheral devices according to the first instruction set and the second configuration information.

The processor of the first terminal drives the target peripheral devices using the second configuration information, based on driving instructions in the first instruction set.

One purpose of using the second configuration information is to drive the target peripheral devices into a working state.

It should be noted that the target peripheral devices of the first terminal refer to a peripheral device installed in the first terminal except the processor of the first terminal, the target peripheral devices may include printers, magnetic cards, card readers, Integrated Circuit Cards (IC cards), for example. The first configuration information corresponding to the target peripheral devices includes first configuration information corresponding to each of peripheral device in the target peripheral devices.

For an example but not a limitation, the same and stable software requirements between different POS terminals may include but are not limited to following requirements:

a1) a security processor is required to realize a safety trigger detection function;
a2) a requirement for supporting key management systems;
a3) a requirement for supporting various security encryption algorithms;
a4) a requirement for providing a remote invocation interface for application processors;
a5) a requirement for supporting authorization system;
a6) a requirement for supporting low power consumption management;
a7) a requirement for supporting secure password input function;
a8) a requirement for supporting stack overflow detection;
a9) a requirement for supporting a buzzer;
a10) a requirement for supporting implementations of card functions.

The different and changing software requirements between different POS terminals may include but are not limited to following requirements:

b1) different security processor models;
b2) different security processor operating frequencies;
b3) different memory capacities and memory layouts;
b4) different flash capacities and layouts;
b5) different functional configurations, for example, some POS terminals support magnetic cards, while some POS terminals do not;
b6) different communication interface resources;
b7) different general-purpose input and output (GPIO) resources;
b8) different data communication methods, for example, some POS terminals support starting Serial Port Direct Memory Access (DMA) communication, and some POS terminals do not support it;

b9) different peripheral device models, such as different printers, contactless, or magnetic card models by different POS terminals;
b10) different wakeup sources;
b11) different printer paper-out detection of sampling values;
b12) different communication speeds;
b13) multiplexing function of different chip pins;
b14) different serial port flow control requirements;
b15) different serial port channels;
b16) different card types;
b17) a requirement that represents different printer models, or represents some POS terminals have not printers.

It should be noted that, in implementations shown in FIG. 1, the first firmware corresponds to a type of a processor of the first terminal, that is, if the type of the processor of the first terminal is changed, firmware to be loaded by the first terminal is not the first firmware any more, but a second firmware corresponding to a type of a replaced processor. In order to achieve this goal, it is necessary to pre-generate firmware corresponding to different types of processors on another terminal, as shown in FIG. 2, in a possible implementation, the above method also includes:

In S201, the second terminal acquires a type of a processor of the first terminal.

In some embodiments, the second terminal acquires the type of a target processor of the first terminal input by a user through a human-computer interaction interface on the second terminal.

In S202, the second terminal selects first preset source codes corresponding to the type of the processor of the first terminal from second preset source codes. The second preset source codes include common logic codes and configuration codes corresponding to each of the plurality of peripheral devices, and different second preset source codes correspond to different types of processors.

It should be noted that the second preset source codes are pre-written. In some embodiments, the second preset source codes are written based on an embedded C language.

The common logic codes in the second preset source codes are common codes, which are used to realize common functions and unified interfaces of same software requirements of different terminals.

The configuration codes corresponding to each of the plurality of peripheral devices in the second preset source codes are different software codes, the configuration codes are used to realize different and changing software requirements among different terminals.

In S203, the second terminal generates the first firmware according to the first preset source codes and loads the first firmware into the first terminal.

The first firmware corresponds to the type of the processor of the first terminal. In response that the type of the processor of the first terminal is changed, the firmware to be loaded by the first terminal is not the first firmware any more, but is the second firmware corresponding to the type of the replaced processor.

In order to further enhance a compatibility of the first firmware loaded to the first terminal, so that the first firmware is not only applicable to differences in configuration attributes of different peripheral devices of the terminal, but also applicable to differences in configuration attributes of different types of processors of the terminal. In an optional implementation manner, the first firmware further includes third configuration information corresponding to each of a plurality of processors, different third configuration information corresponds to different types of the plurality of processors. Correspondingly, the above method further includes:

In S103, the first terminal acquires fourth configuration information corresponding to a type of a processor of the first terminal from the third configuration information by using the first terminal, according to the first instruction set.

In this implementation manner, the first firmware includes the first instruction set, the first configuration information corresponds to each peripheral device, and the third configuration information corresponds to each processor.

In response that the first configuration information and the third configuration information can be stored separately, the first terminal acquires the second configuration information correspond to the first terminal from the first configuration information according to the first instruction set, that is, step S101 is executed. The first terminal acquires the fourth configuration information corresponding to the type of the processor of the first terminal from the third configuration information according to the first instruction set, that is, step S103 is executed.

It should be noted that different first configuration information may be distinguished by different terminal identifiers, and different third configuration information may be distinguished by different type of identifiers of processors. Generally, different terminals correspond to different types of processors, thus different third configuration information can also be distinguished by identifiers of different terminals.

Based on the above embodiments, the first configuration information and the third configuration information may also be combined and stored. Specifically, the third configuration information of a processor corresponding to same terminal and the first configuration information of the plurality of peripheral devices are combined into one group, and different groups of configuration information is distinguished by identifiers of different terminals.

In S104, the first terminal changes a running state parameter of the processor of the first terminal according to the fourth configuration information.

It should be noted that, in this implementation manner, after the processor of the first terminal is powered on, the processor of the first terminal is started based on the startup instructions in the first instruction set, and then the processor runs with a common parameter, thus the processor can drive the plurality of peripheral devices. In order to satisfy processing requirements of the terminal, performance parameters of the processor required by different terminals are different. Therefore, after the first terminal acquires the fourth configuration information corresponding to the type of the processor of the first terminal, the running state parameter of the processor of the first terminal are changed according to the fourth configuration information, so as to adapt to subsequent processing requirements of the terminal.

It should be noted that S103 to S104 and the above-mentioned S101 to S102 can be two parallel implementation schemes.

First Embodiment

In a possible implementation manner, an implementation procedure of S101 may include:

In c1, based on the first instruction set, the first terminal acquires the second configuration information from the first configuration information, according to an identifier of the first terminal.

It can be seen from description of S103 that different first configuration information can be distinguished by identifiers of different terminals. Therefore, based on the first instruction set, the first terminal acquires the second configuration information from the first configuration information, according to the identifier of the first terminal.

It should be noted that, before loading the first firmware, the first terminal acquires the identifier of the first terminal. For example, the identifier of the first terminal is written into the first terminal through an external device.

In some embodiments, specific implementation process of c1 may include following steps.

In c11, the first terminal traverses a first preset list using the identifier of the first terminal according to the first instruction set, and acquires a target storage address corresponding to the identifier of the first terminal. The first preset list includes a plurality of identifiers of different terminals and a plurality of storage addresses corresponding to the plurality of identifiers of different terminals, and the plurality of storage addresses can be memory addresses for storing configuration information of the plurality of peripheral devices.

In one embodiment, the first preset list can be a list of terminal identifiers established through an array and function pointers related to storage addresses corresponding to the terminal identifiers. Any one of the function pointers can be used to indicate storage address of the configuration information of a peripheral device corresponding to a terminal.

Specifically, the first terminal can invoke a selection function according to the search instructions in the first instruction set, use the selection function to traverse the first preset list, and select a target function pointer corresponding to the identifier of the first terminal after traversing the identifier of the first terminal. The target function pointer is used to indicate to store the configuration information of the target peripheral of the first terminal.

In c12, the first terminal acquires the second configuration information, according to the target storage address.

Specifically, the first terminal acquires the second configuration information from a memory corresponding to the target storage address.

The first firmware includes configuration information corresponding to peripheral devices of different terminals, the first preset source codes corresponding to the first firmware includes configuration codes of the peripheral devices corresponding to the different terminals. In one example, for two terminals that are not completely identical but have merely a few differences, configuration codes of peripheral devices corresponding to the two terminals are highly similar. In response that the configuration codes of two highly similar peripheral devices are pre-written in advance, workload of research and development personnel will increase, resulting in a waste of manpower costs. In order to solve this problem, as shown in FIG. 3, in a possible implementation manner, an implementation procedure of S101 may include:

In d1, the first terminal acquires fifth configuration information and sixth configuration information from the first firmware according to the first instruction set. The fifth configuration information is first configuration information corresponding to a peripheral device of a third terminal, and the sixth configuration information is first configuration information corresponding to the target peripheral devices, the sixth configuration information is different from the first configuration information of the peripheral device of the third terminal.

The third terminal and the first terminal are two terminals that are not completely identical and have only a few differences. The fifth configuration information is first configuration information corresponding to a peripheral device of a third terminal, the fifth configuration information is complete configuration information corresponding to the peripheral device of the third terminal. The sixth configuration information is first configuration information corresponding to the target peripheral devices, and the sixth configuration information is different from the first configuration information of the peripheral device of the third terminal, and the sixth configuration information is not the complete configuration information corresponding to configuration information of the target peripheral device.

In d2, the first terminal extracts common seventh configuration information of the first terminal and the third terminal from the fifth configuration information.

In d3, the first terminal obtains the second configuration information according to the sixth configuration information and the seventh configuration information.

The sixth configuration information is configuration information that is different from configuration information of the peripheral device of the third terminal, and the seventh configuration information is configuration information common to the target peripheral device of the first terminal and the peripheral device of the third terminal, the second configuration information can be obtained by combining the sixth configuration information and the seventh configuration information. According to the above procedure, it can be seen that the research and development personnel merely need to complete configuration codes of peripheral devices corresponding to one terminal, and peripheral devices corresponding to another terminal that is similar to the terminal, only needs to write configuration codes of difference part, thereby reducing the workload and saving labor cost, and also saving storage space of the first firmware of the first terminal to a certain extent.

The data processing method in the embodiments of the present application are applicable to a first software framework. The first software framework is divided into an application layer, a peripheral driver layer, a bus of general interface layer, an adaptation layer of bus platform and a processor of an implementation layer of the platform from top to bottom.

Among them, the application layer is responsible for processing application layer logics of a security system. A core function of the application layer is to provide a remote call interface for the application processor.

Interfaces and software of the application layer are same for different terminal products. It does not and does not need to know a current application layer in which product is running on.

The peripheral driver layer is responsible for driver logics of each peripheral module.

It should be noted that differences between different terminal products are often related to peripheral devices. The peripheral driver layer is a core layer that realizes one software for a plurality of hardware. One software for a plurality of hardware refers to a firmware (a set of software codes) that is applicable to various terminals. A driver layer of the peripheral device uses configuration information of peripheral devices in a corresponding terminal through an object-oriented compilation technology to downward call a bus of general interface layer to realize its function.

The bus of general interface layer is responsible for codes that have nothing to do with the implementation layer of the platform. The bus of general interface layer unifies and defines a system bus interface, and provides interface services for the peripheral driver layer that has nothing to do with the implementation layer of the platform.

The adaptation layer of bus platform selects and adapts to bus operations of different processor platforms by means of compilation and function pointers.

The adaptation layer of bus platform can shield differences between the processor platforms, so that software above the adaptation layer of bus platform does not need to pay attention to the differences between different processor platforms.

The implementation layer of a processor platform is responsible for implementing a bus driver for each platform.

The data processing method in the embodiments of the present application are mainly implemented through the driver layer. When the driver layer drives a peripheral device, the processor needs to send a driving command to the peripheral device through corresponding bus to realize driving of the peripheral devices. In this procedure, the processor needs to firstly invoke corresponding bus interface in the bus of general interface layer (a purpose is to realize sending of the driving instructions), and calling the corresponding bus interface that needs to firstly invoke a processor platform, which is compatible with the corresponding bus interface to implement bus driving. After software logics have been executed completely, the processor sends driving instructions to the peripheral devices through corresponding bus, and utilizes configuration information to realize driving of the peripheral devices.

It should be noted that after the peripheral devices have been driven, that is, after a system is initialized, corresponding transaction events can be initiated subsequently. For example, a processor of a POS terminal runs logics of the application layer and initiates a printing service through the application layer. Afterwards, the peripheral driver layer uses the configuration information corresponding to a printer to downward call a bus interface of the corresponding printer. Calling the bus interface of the printer needs to first call a processor platform that is compatible with the bus interface of the printer to implement bus driving. After software logics are executed completely, the processor sends printing instructions to the printer through corresponding bus to realize a printing business.

By performing a method of the embodiments of the present application, when a terminal product needs to be developed, common logic codes does not need to be modified in any way, merely new configuration codes of peripheral devices corresponding to the terminal product need to be added in the first preset source codes. After compilation, system development of the terminal product can be quickly carried out. Since the common logic codes do not need to be changed, while introducing new terminal products, stability of existing terminal products is effectively guaranteed, so that enterprise terminal products updates can have a stable transition.

It should be understood that sequence numbers of the steps in above embodiments do not limit an order of execution, and the order of execution of each procedure should be determined by its function and internal logic, and should not constitute any limitation to implement procedures of the embodiments of the present application.

The embodiments of the present application also provide a data processing system, the data processing system including a first terminal, the first firmware has loaded a first firmware, the first firmware including a first instruction set and first configuration information corresponding to each peripheral device, the first terminal is configured to:

acquire second configuration information from the first firmware according to the first instruction set, the second configuration information being first configuration information corresponding to target peripheral devices of the first terminal; drive the target peripheral devices according to the first instruction set and the second configuration information.

In a possible implementation manner, the data processing system further including a second terminal, and the second terminal is configured to:

acquire a type of a processor of the first terminal;

select first preset source codes corresponding to the type of the processor of the first terminal from second preset source codes, the second preset source codes including common logic codes and configuration codes corresponding to each of the plurality of peripheral devices, and different second preset source codes corresponding to different types of processors;

generate the first firmware according to the first preset source codes and load the first firmware into the first terminal.

In some embodiments, the first firmware further including third configuration information corresponding to each of a plurality of processors, different third configuration information corresponding to different types of the plurality of processors; correspondingly, the first terminal is also used to:

acquire fourth configuration information corresponding to a type of a processor of the first terminal from the third configuration information, according to the first instruction set;

change a running state parameter of the processor of the first terminal according to the fourth configuration information.

In some embodiments, the first terminal is also used to:

based on the first instruction set, acquire the second configuration information from the first configuration information, according to an identifier of the first terminal.

In some embodiments, the first terminal is also used to:

traverse a first preset list using the identifier of the first terminal according to the first instruction set, and acquire a target storage address corresponding to the identifier of the first terminal, the first preset list including a plurality of identifiers of different terminals and a plurality of storage addresses corresponding to the plurality of identifiers of different terminals, and the plurality of storage addresses being memory addresses for storing configuration information of the plurality of peripheral devices;

acquire the second configuration information by the first terminal, according to the target storage address.

In some embodiments, the first terminal is also used to:

acquire fifth configuration information and sixth configuration information from the first firmware according to the first instruction set, wherein the fifth configuration information is first configuration information corresponding to a peripheral device of a third terminal, and the sixth configuration information is first configuration information corresponding to the target peripheral devices, the sixth configuration information is different from the first configuration information of the peripheral device of the third terminal;

extract common seventh configuration information of the first terminal and the third terminal from the fifth configuration information;

obtain the second configuration information according to the sixth configuration information and the seventh configuration information.

The embodiments of the present application also provide a terminal device. Referring to FIG. 4, the terminal device 400 may including at least one processor 410, a storage device 420, and computer programs stored in the storage device 420 and executable on the at least one processor 410, and when the at least one processor 410 executes the computer programs, it implements steps in any of the above-mentioned method embodiments, such as S101 to S102 in the embodiments shown in FIG. 4.

Exemplarily, the computer programs can be divided into one or more modules/units, and one or more modules/units are stored in the storage device 420 and executed by the at least one processor 410 to complete the present application. The one or more modules/units may be a series of computer program segments capable of accomplishing specific functions, and the program segments are used to describe an execution process of the computer programs in the terminal device 400.

Those skilled in the art can understand that FIG. 4 is only an example of a terminal device, and does not constitute a limitation on the terminal device. It may include more or less components than those shown in the figure, or combine some components, or different components, such as input and output devices, network access devices, buses, etc.

The processor 410 can be a central processing unit (CPU), and can also be other general-purpose processors, digital signal processors (DSP), application specific integrated circuits (ASIC), Field-Programmable Gate Array (FPGA) or other programmable logic devices, discrete gate or transistor logic devices, discrete hardware components, etc. A general-purpose processor may be a microprocessor, or the processor may be any conventional processor, or the like.

The storage device 420 may be an internal storage unit of the terminal device, or an external storage device of the terminal device, such as a plug-in hard disk, a smart memory card (SMC), a secure digital (SD) card, a Flash Card, etc. The storage device 420 is configured to store the computer programs and other programs and data required by the terminal device. The storage device 420 can also be used to temporarily store data that has been output or will be output.

The bus can be an Industry Standard Architecture (ISA) bus, Peripheral Component (PCI) bus or Extended Industry Standard Architecture (EISA) bus, etc. The bus can be divided into address bus, data bus, control bus and so on. For ease of representation, the buses in the drawings of the present application are not limited to only one bus or one type of bus.

The data processing method provided by the embodiments of the present application can be applied to computers, tablet computers, notebook computers, netbooks, personal digital assistants (PDA) and other terminal devices, the embodiments of the present application does not impose any limitation on a specific type of the terminal device.

In above-mentioned embodiments, descriptions of each embodiment have their own emphases, and for parts that are not detailed or recorded in a certain embodiment, refer to relevant descriptions of other embodiments.

Those skilled in the art can appreciate that units and algorithm steps of examples described in conjunction with the embodiments disclosed herein can be implemented by electronic hardware, or a combination of computer software and electronic hardware. Whether these functions are executed by hardware or software depends on a specific application and design constraints of a technical solution.

Skilled artisans may use different methods to implement the described functions for each specific application, but such implementation should not be regarded as exceeding the scope of the present application.

In the embodiments provided in the present application, it should be understood that a disclosed terminal equipment, apparatus and method may be implemented in other ways. For example, the terminal device embodiments described above are only illustrative. For example, a division of the modules or units is only a logical function division. In actual implementation, there may be other division methods, such as a plurality of units or components may be combined or may be integrated into another system, or some features may be omitted, or not implemented. In another point, mutual coupling or direct coupling or communication connection shown or discussed may be through some interfaces, and the indirect coupling or communication connection of devices or units may be in electrical, mechanical or other forms.

The units described as separate components may or may not be physically separated, and the components shown as units may or may not be physical units, that is, they may be located in one place, or may be distributed to a plurality of network units. Part or all of the units can be selected according to actual needs to achieve a purpose of the solution of this embodiment.

In addition, each functional unit in each embodiment of the present application may be integrated into one processing unit, each unit may exist separately physically, or two or more units may be integrated into one unit. Above-mentioned integrated units can be implemented in the form of hardware or in the form of software functional units.

If the integrated unit is realized in the form of a software function unit and sold or used as an independent product, it can be stored in a computer-readable storage medium. Based on this understanding, all or part of the processes in the methods of the above embodiments in the present application can also be completed by instructing related hardware through computer programs. The computer programs can be stored in a computer-readable storage medium, and the computer programs are executed by one or more processors, it can realize the steps of the above-mentioned various method embodiments.

Likewise, as a computer program product, when the computer program product is run on the terminal device, the terminal device can implement the steps in the foregoing method embodiments when executed.

The computer programs include computer program codes, and the computer program codes may be in a form of source codes, object codes, executable files or some intermediate form. A computer readable medium may include any entity or device capable of carrying the computer program codes, recording medium, U disk, removable hard disk, magnetic disk, optical disk, computer memory, read-only memory (ROM), Random Access Memory (RAM), electrical carrier signal, telecommunication signal and software distribution medium, etc. It should be noted that content contained in the computer-readable medium may be appropriately increased or decreased according to requirements of legislation and patent practice in the jurisdiction. For example, in some jurisdictions, the computer readable medium does not include electrical carrier signals or telecommunications signals.

The above-described embodiments are only used to illustrate technical solutions of the present application, rather than to limit them. Although the present application has been described in detail with reference to the foregoing embodiments, those of ordinary skill in the art should understand that they can still modify the technical solutions described in the aforementioned embodiments, or make equivalent substitutions for some of the technical features therein, and these modifications or substitutions do not cause the essence of the corresponding technical solutions to deviate from spirit and scope of the technical solutions of the embodiments of the present application, and should all be included in a scope of protection of the present application.

What is claimed is:

1. A method of generating firmware compatible peripheral device drivers, applied in a first terminal, which has loaded a first firmware, the first firmware comprising a first instruction set and first configuration information corresponding to each of a plurality of peripheral devices, the first firmware comprising configuration information corresponding to peripheral devices of different terminals, the method comprising:

acquiring second configuration information from the first firmware according to the first instruction set by using the first terminal, comprising: acquiring fifth configuration information and sixth configuration information from the first firmware according to the first instruction set by using the first terminal, the fifth configuration information representing first configuration information corresponding to a peripheral device of a third terminal, and the sixth configuration information representing first configuration information corresponding to target peripheral devices, the sixth configuration information being different from the first configuration information of the peripheral device of the third terminal, the third terminal and the first terminal being two different terminals; extracting common seventh configuration information of the first terminal and the third terminal from the fifth configuration information by using the first terminal, the seventh configuration information representing configuration information common to the target peripheral device of the first terminal and the peripheral device of the third terminal; and obtaining the second configuration information according to the sixth configuration information and the seventh configuration information by using the first terminal, the second configuration information being first configuration information corresponding to the target peripheral devices of the first terminal; and driving the target peripheral devices according to the first instruction set and the second configuration information by using the first terminal.

2. The method of generating firmware compatible peripheral device drivers of claim 1, further comprising:

acquiring a type of a processor of the first terminal by a second terminal;

selecting first preset source codes corresponding to the type of the processor of the first terminal from second preset source codes by the second terminal, the second preset source codes comprising common logic codes and configuration codes corresponding to each of the plurality of peripheral devices, and different second preset source codes corresponding to different types of processors; and generating the first firmware according to the first preset source codes and loading the first firmware into the first terminal by the second terminal.

3. The method of generating firmware compatible peripheral device drivers of claim 1, wherein the first firmware further comprises third configuration information corresponding to each of a plurality of processors, different third configuration information corresponding to different types of the plurality of processors, and the method further comprises:

acquiring fourth configuration information corresponding to a type of a processor of the first terminal from the third configuration information by using the first terminal, according to the first instruction set; and changing a running state parameter of the processor of the first terminal according to the fourth configuration information by using the first terminal.

4. The method of generating firmware compatible peripheral device drivers of claim 1, wherein acquiring the second configuration information from the first firmware according to the first instruction set by using the first terminal comprises:

based on the first instruction set, acquiring the second configuration information from the first configuration information using the first terminal, according to an identifier of the first terminal.

5. The method of generating firmware compatible peripheral device drivers of claim 4, wherein based on the first instruction set, acquiring the second configuration information from the first configuration information using the first terminal, according to the identifier of the first terminal comprises:

traversing a first preset list using the identifier of the first terminal according to the first instruction set by the first terminal, and acquiring a target storage address corresponding to the identifier of the first terminal, the first preset list comprising a plurality of identifiers of different terminals and a plurality of storage addresses corresponding to the plurality of identifiers of different terminals, and the plurality of storage addresses being memory addresses for storing configuration information of the plurality of peripheral devices; and acquiring the second configuration information by the first terminal, according to the target storage address.

6. A first terminal comprising:

a first firmware, the first firmware comprising a first instruction set and first configuration information corresponding to each of a plurality of peripheral devices, the first firmware comprising configuration information corresponding to peripheral devices of different terminals;

a processor; and a storage device storing computer program, which when executed by the processor, cause the processor to:

acquire second configuration information from the first firmware according to the first instruction set by using the first terminal, comprising: acquire fifth configuration information and sixth configuration information from the first firmware according to the first instruction set by using the first terminal, the fifth configuration information representing first configuration information corresponding to a peripheral device of a third terminal, and the sixth configuration information representing first configuration information corresponding to target peripheral devices, the sixth configuration information being different from the first configuration information of the peripheral device of the third terminal, the third terminal and the first terminal being two different terminals; extract common seventh configuration information of the first terminal and the third terminal from the fifth configuration information, the seventh configuration information representing configuration information common to the target peripheral device of the first terminal and the peripheral device of the third terminal; and obtain the second configuration information according to the sixth configuration information and the seventh configuration information, the second configuration information being first configuration information corresponding to the target peripheral devices of the first terminal; and drive the target peripheral devices according to the first instruction set and the second configuration information.

7. The first terminal of claim 6, wherein the first terminal is in communication with a second terminal, which is configured to:

acquire a type of a processor of the first terminal;

select first preset source codes corresponding to the type of the processor of the first terminal from second preset source codes, the second preset source codes comprising common logic codes and configuration codes corresponding to each of the plurality of peripheral devices, and different second preset source codes corresponding to different types of processors; and generate the first firmware according to the first preset source codes and load the first firmware into the first terminal.

8. The first terminal of claim 6, wherein the first firmware further comprises third configuration information corresponding to each of a plurality of processors, different third configuration information corresponding to different types of the plurality of processors, and the processor of the first terminal is further caused to:

acquire fourth configuration information corresponding to a type of a processor of the first terminal from the third configuration information, according to the first instruction set; and change a running state parameter of the processor of the first terminal according to the fourth configuration information.

9. The first terminal of claim 6, wherein the processor of the first terminal is further caused to:

based on the first instruction set, acquire the second configuration information from the first configuration information, according to an identifier of the first terminal.

10. The first terminal of claim 9, wherein the processor of the first terminal is further caused to:

traverse a first preset list using the identifier of the first terminal according to the first instruction set, and acquire a target storage address corresponding to the identifier of the first terminal, the first preset list comprising a plurality of identifiers of different terminals and a plurality of storage addresses corresponding to the plurality of identifiers of different terminals, and the plurality of storage addresses being memory addresses for storing configuration information of the plurality of peripheral devices; and acquire the second configuration information according to the target storage address.

11. A non-transitory computer-readable storage medium of a first terminal having stored computer program, which when executed by a processor, causes the processor to perform a method of generating firmware compatible peripheral device drivers, the first terminal comprising a first firmware, the first firmware comprising a first instruction set and first configuration information corresponding to each of a plurality of peripheral devices, the first firmware comprising configuration information corresponding to peripheral devices of different terminals, the method comprising:

acquiring second configuration information from the first firmware according to the first instruction set by using the first terminal, comprising: acquiring fifth configuration information and sixth configuration information from the first firmware according to the first instruction set by using the first terminal, the fifth configuration information representing first configuration information corresponding to a peripheral device of a third terminal, and the sixth configuration information representing first configuration information corresponding to target peripheral devices, the sixth configuration information being different from the first configuration information of the peripheral device of the third terminal, the third terminal and the first terminal being two different terminals; extracting common seventh configuration information of the first terminal and the third terminal from the fifth configuration information by using the first terminal, the seventh configuration information representing configuration information common to the target peripheral device of the first terminal and the peripheral device of the third terminal; and obtaining the second configuration information according to the sixth configuration information and the seventh configuration information by using the first terminal, the second configuration information being first configuration information corresponding to the target peripheral devices of the first terminal; and driving the target peripheral devices according to the first instruction set and the second configuration information.

12. The non-transitory computer-readable storage of claim 11, wherein the first terminal is in communication with a second terminal, which is configured to:

acquire a type of a processor of the first terminal;

select first preset source codes corresponding to the type of the processor of the first terminal from second preset source codes, the second preset source codes comprising common logic codes and configuration codes corresponding to each of the plurality of peripheral devices, and different second preset source codes corresponding to different types of processors; and generate the first firmware according to the first preset source codes and load the first firmware into the first terminal.

13. The non-transitory computer-readable storage of claim 11, wherein the first firmware further comprises third configuration information corresponding to each of a plurality of processors, different third configuration information corresponding to different types of the plurality of processors, and the method further comprises:

acquiring fourth configuration information corresponding to a type of a processor of the first terminal from the third configuration information, according to the first instruction set; and changing a running state parameter of the processor of the first terminal according to the fourth configuration information.

14. The non-transitory computer-readable storage of claim 11, wherein acquiring the second configuration information from the first firmware according to the first instruction set by using the first terminal comprises:

based on the first instruction set, acquiring the second configuration information from the first configuration information, according to an identifier of the first terminal.

15. The non-transitory computer-readable storage of claim 14, wherein based on the first instruction set, acquiring the second configuration information from the first configuration information using the first terminal, according to the identifier of the first terminal comprises:

traversing a first preset list using the identifier of the first terminal according to the first instruction set, and acquiring a target storage address corresponding to the identifier of the first terminal, the first preset list comprising a plurality of identifiers of different terminals and a plurality of storage addresses corresponding to the plurality of identifiers of different terminals, and the plurality of storage addresses being memory addresses for storing configuration information of the plurality of peripheral devices; and acquiring the second configuration information, according to the target storage address.

* * * * *